US008527415B2

(12) United States Patent
Blythe

(10) Patent No.: US 8,527,415 B2
(45) Date of Patent: Sep. 3, 2013

(54) TECHNIQUES FOR CONDUCTING FINANCIAL TRANSACTIONS USING MOBILE COMMUNICATION DEVICES

(75) Inventor: Simon Blythe, Ely (GB)

(73) Assignee: Mastercard International, Inc., Purchase, NY (US)

( * ) Notice: Subject to any disclaimer, the term of this patent is extended or adjusted under 35 U.S.C. 154(b) by 412 days.

(21) Appl. No.: 11/964,819

(22) Filed: Dec. 27, 2007

(65) Prior Publication Data
US 2009/0171842 A1 Jul. 2, 2009

(51) Int. Cl.
G06Q 40/00 (2012.01)
G06Q 40/02 (2012.01)

(52) U.S. Cl.
CPC ..................... G06Q 40/02 (2013.01)
USPC ............................. 705/44; 705/35

(58) Field of Classification Search
USPC ..................................... 705/35–45
See application file for complete search history.

(56) References Cited

U.S. PATENT DOCUMENTS

| 4,677,657 A | | 6/1987 | Nagata et al. | |
|---|---|---|---|---|
| 5,310,999 A | * | 5/1994 | Claus et al. | 235/384 |
| 5,490,079 A | * | 2/1996 | Sharpe et al. | 705/418 |
| 5,857,152 A | * | 1/1999 | Everett | 455/406 |
| 6,366,220 B1 | * | 4/2002 | Elliott | 340/928 |
| 6,594,361 B1 | | 7/2003 | Chaney et al. | |
| 6,650,902 B1 | * | 11/2003 | Richton | 455/456.3 |
| 6,653,946 B1 | * | 11/2003 | Hassett | 340/928 |
| 6,664,922 B1 | * | 12/2003 | Fan | 342/357.1 |
| 7,026,984 B1 | * | 4/2006 | Thandu et al. | 342/357.09 |
| 7,069,438 B2 | | 6/2006 | Balabine et al. | |
| 7,206,847 B1 | | 4/2007 | Alberth, Jr. et al. | |
| 7,221,949 B2 | * | 5/2007 | Clough | 455/456.3 |
| 7,255,264 B2 | * | 8/2007 | De Leon | 235/375 |
| 7,260,727 B2 | | 8/2007 | Fougeroux et al. | |
| 7,263,507 B1 | | 8/2007 | Brake, Jr. et al. | |
| 8,078,538 B1 | * | 12/2011 | Buch et al. | 705/44 |
| 2001/0027422 A1 | * | 10/2001 | Brandrud | 705/26 |
| 2002/0072379 A1 | * | 6/2002 | Chen et al. | 455/456 |
| 2003/0126079 A1 | * | 7/2003 | Roberson et al. | 705/40 |
| 2003/0189498 A1 | * | 10/2003 | Kakihara et al. | 340/928 |
| 2004/0203862 A1 | * | 10/2004 | Wood et al. | 455/456.1 |
| 2005/0064877 A1 | * | 3/2005 | Gum et al. | 455/456.1 |
| 2005/0071671 A1 | * | 3/2005 | Karaoguz | 713/200 |
| 2005/0137975 A1 | * | 6/2005 | Williams | 705/40 |

(Continued)

FOREIGN PATENT DOCUMENTS
WO  WO 2004097747 A2 * 11/2004

OTHER PUBLICATIONS

Warta, Tamara. Koreans Can Now Pay for Tolls with Cell Phones. Sep. 18, 2007. Inventor Spot. http://inventorspot.com/articles/cars_dont_stop_korea_6941.*

(Continued)

Primary Examiner — Kambiz Abdi
Assistant Examiner — Stephanie M Ziegle
(74) Attorney, Agent, or Firm — Hoffmann & Baron, LLP

(57) ABSTRACT

The present invention advantageously combines communications aspects of mobile devices with financial transaction system capabilities in a novel manner. This advantageous combination enables a user to automatically initiate a financial transaction with a merchant upon the user being located in a particular geographic vicinity. Numerous types of transactions can be enabled using the present invention.

11 Claims, 3 Drawing Sheets

(56) References Cited

U.S. PATENT DOCUMENTS

| | | |
|---|---|---|
| 2005/0215194 A1 | 9/2005 | Boling et al. |
| 2006/0052115 A1* | 3/2006 | Khushu ............... 455/456.3 |
| 2007/0012763 A1 | 1/2007 | Van de Velde et al. |
| 2007/0131761 A1 | 6/2007 | Smets et al. |
| 2007/0174082 A1* | 7/2007 | Singh ............................ 705/1 |
| 2007/0244811 A1* | 10/2007 | Tumminaro ................ 705/39 |
| 2008/0033817 A1* | 2/2008 | Billmaier et al. ............. 705/14 |
| 2008/0059557 A1* | 3/2008 | DeSantis et al. ............ 709/201 |
| 2008/0275779 A1* | 11/2008 | Lakshminarayanan ........ 705/14 |
| 2009/0144136 A1* | 6/2009 | Cohagan et al. ............. 705/13 |
| 2009/0187492 A1* | 7/2009 | Hammad et al. ............. 705/26 |

OTHER PUBLICATIONS

Introduction to the Global Positioning System for GIS and TRAVERSE. Nov. 2, 2000. http://web.archive.org/web/20001102143022/http://www.cmtinc.com/gpsbook/index.htm.*

Caffery et al, Overview of radiolocation in CDMA cellular systems, IEEE Commuincations Magazine, Apr. 1998, pp. 38-45, available online @ http://ieeexplore.ieee.org/xpls/abs_all.jsp?arnumber=667411.*

Steiniger et al, Foundations of Location Based Services. Feb. 28, 2006. http://web.archive.org/web/20060228090250/http://www.geo.unizh.ch/publications/cartouche/lbs_lecturenotes_steinigeretal2006.pdf.*

* cited by examiner

TECHNIQUES FOR CONDUCTING FINANCIAL TRANSACTIONS USING MOBILE COMMUNICATION DEVICES

BACKGROUND OF THE INVENTION

1. Field of the Invention

The present invention generally relates to financial transaction systems, and more particularly to conducting a financial transaction using a mobile communication device.

2. Brief Description of the Related Art

Today, financial transactions systems (FTS) are generally well known in the art and can include both wired communication systems and wireless communication systems. Typically, these systems include one or more payment devices and a payment terminal for processing financial transactions. The payment devices can include credit, debit, prepaid and smart cards, as well as cellular phones, personal digital assistants (PDAs), and other types of devices.

Global Positioning Systems (GPS) are also becoming increasingly available. Typically, these systems are used for navigation purposes and include hand-held receivers that can lock on to wireless signals to calculate a 2D position (latitude and longitude) and track movement. In the past, tracking individuals with GPS technology required purchasing special and expensive hardware and software. Today, various solutions are available through cellular service providers. For example, GPS-enabled cell phones are becoming more prevalent in the marketplace.

With cellular technology providing consistent communication capabilities and the use of GPS-based devices becoming more accessible and prevalent, there is a need in the art for techniques for utilizing GPS-based capabilities in financial transactions.

SUMMARY OF THE INVENTION

The present invention advantageously combines communications aspects of mobile devices with financial transaction system capabilities in a novel manner. This advantageous combination enables a user to automatically initiate a financial transaction with a merchant upon the user being located in a particular geographic vicinity. Numerous types of transactions can be enabled using the present invention.

Various aspects of the system relate to conducting financial transactions using geographic location information. For example, according to one aspect, a system for conducting a financial transaction exchange includes a payment terminal for charging a user account to complete a financial transaction, and a payment device capable of (i) sending a financial transaction instruction to the payment terminal, the instruction competent to charge the user account through the terminal, and (ii) calculating a geographic location for the device in response to receiving a plurality of distance signals. Preferably, the instruction is sent based on the calculated geographic location and an authorized activation of the device.

In one preferred embodiment, the payment device includes a global positioning system to provide said geographic location. Preferably, the payment terminal and the payment device are operatively coupled via a wireless network.

In one preferred embodiment, the payment device compares the calculated geographic location to a predefined geographic location and sends the instruction based on the comparison. The system can also include a graphical user interface for identifying the predefined geographic location.

Preferably, the graphical user interface displays a map on the payment device for selecting the predefined geographic location.

Preferably, the payment terminal transmits an acknowledgement to the payment device upon completion of the transaction. In one preferred embodiment, the system includes a map server that provides a map to the payment device to select the predefined geographic location. In another preferred embodiment, the payment terminal associates a fee for processing the transaction.

In yet another aspect, a method of conducting a transaction exchange includes providing a payment terminal for charging a user account to complete a financial transaction. The method also includes providing a payment device capable of (i) sending a financial transaction instruction to the payment terminal, the instruction competent to charge the user account through the terminal, and (ii) calculating a geographic location for the device in response to receiving a plurality of distance signals, wherein the instruction is sent based on the calculated geographic location and an authorized activation of the device.

In one preferred embodiment, the method includes calculating the geographic location using a trilateration technique. The method can also include coupling operatively the payment terminal and the payment device using a wireless network.

In one preferred embodiment, the method further includes comparing the calculated geographic location to a predefined geographic location, and sending the instruction based on the comparison.

In another preferred embodiment, the method further includes selecting the predefined geographic location using a graphical user interface. The method can also include displaying a map on the payment device for selecting the predefined geographic location.

In yet another preferred embodiment, the method further includes transmitting an acknowledgement from the payment terminal to the payment device upon completion of the transaction. The method can further include providing a map to said payment device from a map server and charging a fee for processing said transaction.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

Like reference symbols in the various drawings indicate like elements.

DETAILED DESCRIPTION OF THE PREFERRED EMBODIMENTS

The invention described provides a system and method for executing financial transactions using existing and available technology in a novel manner. The preferred technique allows an individual to use a GPS-enabled mobile communication device, such as a cell phone, as a payment device to automate a business transaction.

Figure 1:
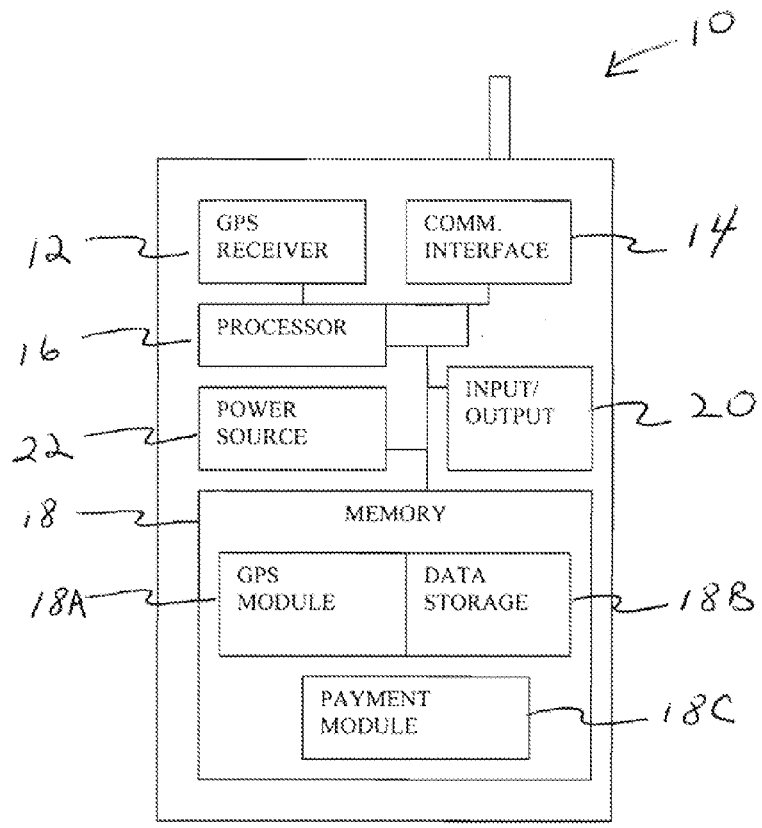
FIG. 1 is a block diagram of a mobile communication device according to the present invention.

FIG. 1 is a block diagram illustrating a payment device 10 according to the present invention. As shown in FIG. 1, the payment device can be a mobile communication device 10 that includes a GPS receiver 12, communication interface 14, processing unit 16, memory 18, input/output interface 20, and a power source 22, such as a battery.

The communication interface 14 preferably includes a particular structure and functionality based upon the type of the device 10. For example, when the device 10 is a cellular telephone, the communication interface 14 supports a corresponding interface standard e.g., Global System for Mobile communication (GSM), General Packet Radio Service (GPRS), Enhanced Data Rates for Global Evolution (EDGE), Universal Mobile Telecommunications Service (UMTS), etc. The communication interface 14 of the device 10 may also/alternately support Wireless Wide Area Network (WWAN), Wireless Local Area Network (WLAN), and/or Wire-less Personal Area Network (WPAN) functionality.

When the device 10 is a WLAN device for example, the wireless interface 14 preferably supports a standardized communication according to the IEEE 802.11x group of standards, for example. When the device 10 is a WPAN device, the wireless interface 14 preferably supports the Bluetooth interface standard or another WPAN standard such as the 802.15 standard. In any case, the wireless interface 14 can support all or a subset of cellular telephone, WLAN, and WPAN operations.

The processing unit 16 of the device 10 may include any type of processor such as a microprocessor, a digital signal processor, an Application Specific Integrated Circuit (ASIC), or a combination of processing type devices. The processing unit 16 is operable to execute a plurality of software instructions that are stored in the memory 18 and are accessed for execution. The processing unit 16 may also include specialized hardware required to implement particular aspects of the present invention. Memory 18 may include SRAM, DRAM, PROM, flash RAM, or any other type of memory capable of storing data and instructions.

The input/output interface 20 may include a keypad, a mouse, a screen, a touch screen, and/or any other type of interface that allows a user of the device 10 to interact with the device 10. The power source 22, such as a battery, operates to power the components of the device 10.

The GPS receiver 12 operates to receive GPS signals from a plurality of satellites that operate as part of a GPS system. In one preferred embodiment, the GPS receiver 12 determines a geographic location for the device 10 by calculating a distance between the device 10 and at least three satellites. Preferably, the receiver 12 calculates the distance using low-power radio signals received from the satellites using a technique known as Trilateration, which is known in the art.

The memory 18 of the device is configured to include a GPS module 18A that provides a graphical user interface on the device 10 to identify payment locations, one or more data storage areas 18B for storing location coordinates identified by the user, and a payment module 18C capable of initiating a financial transaction instruction to a payment terminal based on a geographic location of the device 10. Details of the GPS module 18A and payment module 18C are discussed in connection with FIGS. 3-4.

Figure 2:
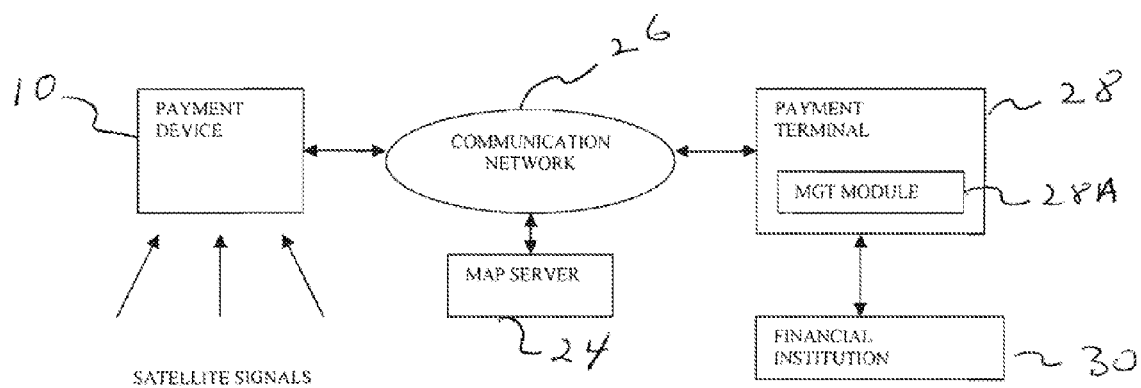
FIG. 2 is a block diagram of a financial transaction system using a mobile communication device according to the present invention.

Referring now to FIG. 2, a financial transaction system for conducting a financial transaction using a mobile communication payment device is disclosed. The system can be used to automate financial transactions based on a geographic location of the payment device 10.

As shown in FIG. 2, the system includes the payment device 10 disclosed in connection with FIG. 1, a payment terminal 28 that can operate as a point of sale (POS) terminal for merchants, and a network 26 for operatively connecting the payment device 10 to the payment terminal 28. Although only one payment device 10 is shown in FIG. 2, the present invention is not limited to one payment device and can include a multitude of varied payment devices that are capable of communicating using a wireless protocol.

The payment terminal 28 is preferably a computer device that operates as a point of sale terminal for goods or services rendered. In one preferred embodiment, the payment terminal 28 includes a management module 28A that processes financial transaction instructions received from the device 10 and provides an acknowledgement message to the payment device 10 upon completion of a transaction.

As shown in FIG. 2, the payment terminal 28 is preferably in communication with a financial institution 30, such as a bank, which has access to a conventional payment network for transaction authorizations.

In one preferred embodiment, as shown in FIG. 2, the system includes a map server 24 that provides maps to the payment device 10 on demand. As used herein, the term 'map' refers to a representation of the whole or a part of a geographic area. Use of the map server 24 is discussed in connection with FIGS. 3 and 4 of the disclosure.

The network 26 is preferably a wireless network that can be an 802.11-compliant network, Bluetooth network, cellular digital packet data (CDPD) network, high speed circuit switched data (HSCSD) network, packet data cellular (PDC-P) network, general packet radio service (GPRS) network, 1x radio transmission technology (1xRTT) network, IrDA network, multichannel multipoint distribution service (MMDS) network, local multipoint distribution service (LMDS) network, worldwide interoperability for microwave access (WiMAX) network, and/or any other network that communicates using a wireless protocol.

Figure 3:
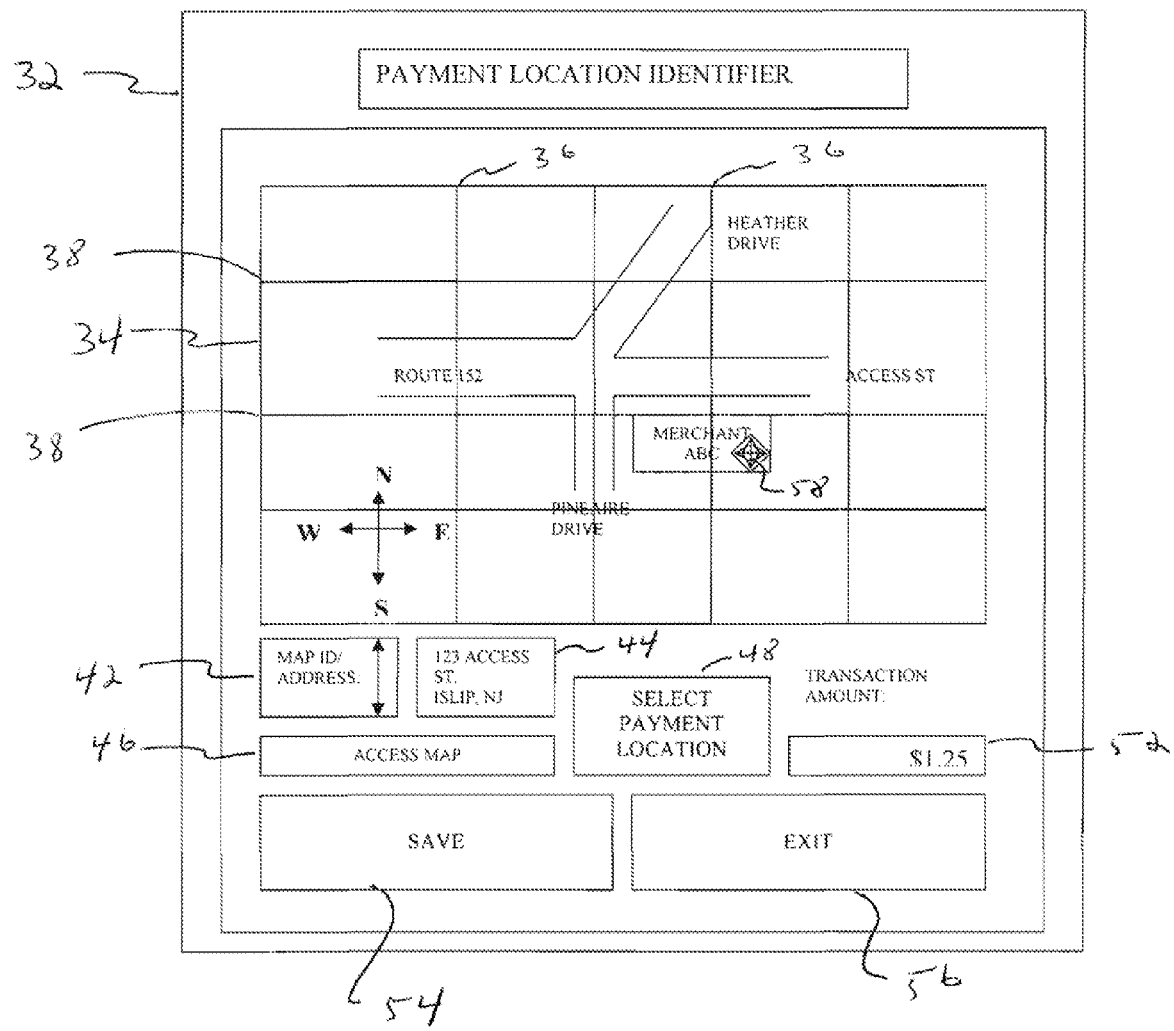
FIG. 3 is an example graphical user interface for defining a transaction location.

Referring now to FIG. 3, an example graphical user interface (GUI) 32 provided by the GPS module 18A is shown. In one preferred embodiment, the GPS module 18A displays the user interface 32 on the screen 20 of the payment device 10 and prompts the user to enter either an address or MAP name that identifies a particular geographic area to be displayed on the device 10. In another preferred embodiment, the GPS module 18A displays the graphical user interface 32 on a Personal Computer (PC) attached to the device 10 and prompts the user to enter either an address or map name to be displayed on the device 10.

As shown in the FIG. 3 example, the graphical user interface 32 of the present invention includes a map area 34, a map-name/address area 42 with map-name/address entry area 44, an access-map button 46, a charge-amount entry area 52, and a select-payment-location button 48.

The map-name/address area 42 provides a listing of previously accessed maps and entered addresses that are user selectable and available for display on the device 10. In the event a particular map name or address is not included in the area 42, map-name/address entry area 44 provides a data entry area for entering the particular address or map name which, upon selection of access-map button 46, is displayed on the device 10. In one preferred embodiment, the GPS module 18A requests the associated map from the map server 24 which is then displayed in map area 34. In another preferred embodiment, the GPS module 18A accesses the associated map from memory 18 of the device 10 and displays the same in the map area 34. As shown in FIG. 3, in one preferred embodiment, the map displayed can include latitudinal 38 and longitudinal 36 coordinates representing varying degrees of specificity concerning geographic locations and coordinates.

Once a map is displayed in the map area 34 and the user selects select-payment-location button 48, the user can then select transaction locations for automatic payment. For example, in one preferred embodiment, upon selection of select-payment-location button 48, the GPS module 18A displays a cursor that overlays the displayed map and allows the user to identify a particular location 58 on the map where a payment is to be automatically commenced.

Once a transaction location 58 is identified on the map, the GPS module 18A activates the transaction amount data entry area 52 that allows the user to specify a monetary amount for the transaction.

Once a value is entered into data entry area 52 and the user selects the save button 54, the GPS module 18A saves the identified transaction location and entered transaction amount to the data storage area 18B. For example, in one preferred embodiment, the GPS module 18A calculates transaction coordinates using one or more particular transaction locations 58 identified on the map and stores the calculated transaction coordinates along with the entered transaction amount to the data storage area 18B. Upon the user selecting the exit button 56, the GPS module 30 terminates display of the GUI 32.

Figure 4:
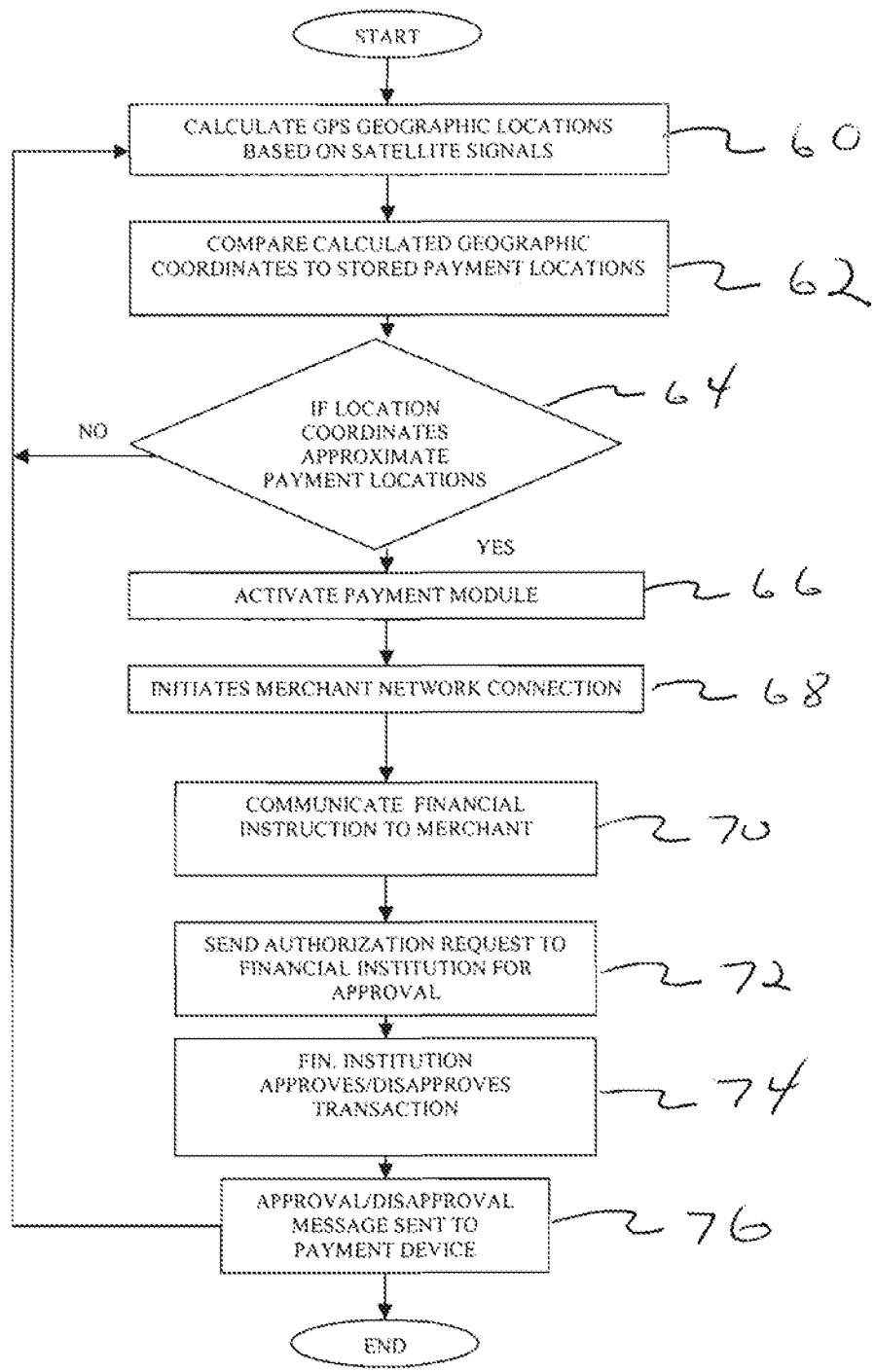
FIG. 4 is a flow chart of a method for conducting location-based financial transactions.

Turning now to FIG. 4, a typical financial transaction executed by the system using the techniques of the present invention will now be described. As shown in the FIG. 4 example, first, the GPS module 18A of the payment device 10 calculates the current geographical coordinates of the device 10 upon receiving a plurality of satellite signals 60. As mentioned previously, in one preferred embodiment, the GPS module 18A uses a trilateration technique to determine geographic coordinates of the device 10. Next, the GPS module 18A compares the calculated geographic coordinates to predefined transaction locations (or predefined geographic locations) 62 stored in the data storage areas 18 of the device 10. In one preferred embodiment, if the calculated coordinates are within a particular distance of one of the predefined transaction locations 64, the GPS module 18A activates the payment module 18C to initiate a financial transaction 66 over the network 26. If the calculated coordinates are not within a particular distance of any of the stored transaction locations 64, the GPS module 18A continues to calculate the device's current geographical location and continues its comparisons.

Once the payment module 18C is activated, the payment module 18C initiates a network connection 68 to the payment terminal 28. In one preferred embodiment, where the payment device 10 is a cellular phone, a telephone company (TELCO) provider can be used as a gateway into one or more payment networks. For example, an arrangement can be made between the user of the device 10 and the TELCO provider such that the TELCO provider would charge a fee for supporting location dependent transactions.

In one preferred embodiment, the payment module 18C initiates the network connection by polling for a wireless network connection as is known in the art. Preferably, the network connection is a secure connection that includes encryption and digital authentication. Upon the payment terminal 28 verifying the authenticity of the payment device 10, the payment terminal 28 grants network access to the payment device 10.

Once the payment device 10 is connected to the network 26, the payment module 18C can send financial transaction instructions to the payment terminal to charge a particular account a predefined transaction amount automatically 70.

Next, upon transmission of a financial transaction instruction from the payment device 10 to the payment terminal 28, the management module 28A of the payment terminal 28 transmits an authorization request to the financial institution 30 for approval 72. In one preferred embodiment, the financial institution 30 in turn forwards the authorization request through a conventional payment network to a credit grantor. Based upon the payment device user's account status and the amount of transaction, the credit grantor can authorize or deny the authorization request 74. The grantor's response is then routed back through the financial institution 30 to the payment terminal 28 and payment device 10 (76).

A number of embodiments of the invention have been described. Nevertheless, it will be understood that various modifications may be made without departing from the spirit and scope of the invention. For example, payment terminals can provide messages to payment devices that could include information relating to upcoming offers and sales. Also, the steps described above may be modified in various ways or performed in a different order than described above, where appropriate. Accordingly, alternative embodiments are within the scope of the following claims.

What is claimed is:

1. A method of conducting a transaction exchange comprising:
providing a payment terminal with a computer device for charging a user account to complete a financial transaction;
providing a payment device with a processing unit configured to use a global positioning system to automatically complete said financial transaction;
accepting a user input into said payment device containing a transaction amount and a selected geographic location corresponding to a geographic location of said payment device;
calculating, with said payment device, a current geographic location for said payment device in response to receiving a plurality of distances signals from said global positioning system; and
comparing said calculated current geographic location to said selected geographic location and if said payment device determines that said calculated current geographic location is within a predefined distance of said selected geographic location, said payment device automatically initiates a secure connection to said payment terminal and sends a financial transaction instruction to said payment terminal, said instruction instructing said payment terminal to charge said user account associated with a financial institution and to automatically complete said financial transaction.

2. The method of claim 1, comprising using said payment device to calculate said current geographic location using a trilateration technique.

3. The method of claim 1, comprising coupling operatively said payment terminal and said payment device using a network.

4. The method of claim 3, wherein said network is a wireless network.

5. The method of claim 1, wherein said payment device compares said calculated current geographic location to a selected geographic location using a GPS module.

6. The method of claim 1, further comprising identifying said selected geographic location using a graphical user interface.

7. The method of claim 6, comprising displaying a map on said payment device for selecting said selected geographic location.

8. The method of claim 1, wherein said payment terminal completes said transaction.

9. The method of claim 1, further comprising providing a map to said payment device from a map server.

10. The method of claim 8, further comprising charging a fee for processing said transaction between said payment device and said payment terminal.

11. The method of claim 8, further comprising transmitting an acknowledgement from said payment terminal to said payment device upon completion of said transaction.

* * * * *